United States Patent
Wu et al.

(10) Patent No.: US 11,762,427 B2
(45) Date of Patent: Sep. 19, 2023

(54) COVERS FOR ELECTRONIC DEVICES

(71) Applicant: HEWLETT-PACKARD DEVELOPMENT COMPANY, L.P., Spring, TX (US)

(72) Inventors: Kuan-Ting Wu, Taipei (TW); Ya-Ting Yeh, Taipei (TW); Chih-Hsiung Liao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 253 days.

(21) Appl. No.: 17/418,464

(22) PCT Filed: Feb. 1, 2019

(86) PCT No.: PCT/US2019/016251
§ 371 (c)(1),
(2) Date: Jun. 25, 2021

(87) PCT Pub. No.: WO2020/159531
PCT Pub. Date: Aug. 6, 2020

(65) Prior Publication Data
US 2022/0066515 A1    Mar. 3, 2022

(51) Int. Cl.
*G06F 1/16* (2006.01)
(52) U.S. Cl.
CPC .......... *G06F 1/1656* (2013.01); *G06F 1/1616* (2013.01)
(58) Field of Classification Search
CPC ...... G06F 1/1616; G06F 1/1656; C25D 11/30
See application file for complete search history.

(56) References Cited

U.S. PATENT DOCUMENTS

| | | |
|---|---|---|
| 2012/0147541 A1 | 6/2012 | Chen et al. |
| 2016/0050302 A1 | 2/2016 | Lee et al. |
| 2016/0085353 A1 | 3/2016 | Lee et al. |
| 2017/0075385 A1 | 3/2017 | Flueckiger et al. |
| 2017/0226654 A1 | 8/2017 | Kashyap et al. |
| 2021/0363646 A1* | 11/2021 | Chang ................. C23C 14/0015 |
| 2023/0031605 A1* | 2/2023 | Wu ....................... C25D 11/30 |

(Continued)

FOREIGN PATENT DOCUMENTS

| | | |
|---|---|---|
| CN | 104661478 | 5/2015 |
| CN | 205755180 | 11/2016 |
| CN | 206164609 | 5/2017 |

(Continued)

*Primary Examiner* — Anthony Q Edwards
(74) *Attorney, Agent, or Firm* — HP Inc. Patent Department

(57) ABSTRACT

The present disclosure is drawn to covers for electronic devices. In one example, a cover for an electronic device can include an aluminum or aluminum alloy cover frame having an opening. A magnesium or magnesium alloy cover panel supported by the aluminum or aluminum alloy cover frame within or over the opening. A protective coating can be over a surface of the aluminum or aluminum alloy cover frame and a surface of the magnesium or magnesium alloy cover panel. A chamfered edge can include a chamfer at an edge of the aluminum or aluminum alloy cover frame. The chamfer can expose the aluminum or aluminum alloy cover frame beneath the protective coating, and the chamfer at the same time does not expose the magnesium or magnesium alloy cover panel.

15 Claims, 4 Drawing Sheets

(56) References Cited

U.S. PATENT DOCUMENTS

2023/0034431 A1* 2/2023 Wu .................. G06F 3/0202
2023/0117648 A1* 4/2023 Dunne ................ C25D 11/026
                                                                                                         428/632

FOREIGN PATENT DOCUMENTS

| | | |
|---|---|---|
| JP | 2003-318583 A | 11/2003 |
| JP | 2006-135640 A | 5/2006 |
| JP | 2007-194545 A | 8/2007 |
| KR | 101420614 | 7/2014 |
| WO | WO-2016204339 | 11/2016 |

* cited by examiner

COVERS FOR ELECTRONIC DEVICES

BACKGROUND

The use of personal electronic devices of all types continues to increase. Cellular phones, including smartphones, have become nearly ubiquitous. Tablet computers have also become widely used in recent years. Portable laptop computers continue to be used by many for personal, entertainment, and business purposes. For portable electronic devices in particular, much effort has been expended to make these devices more useful and more powerful while at the same time making the devices smaller, lighter, and more durable. The aesthetic design of personal electronic devices is also of concern in this competitive market.

DETAILED DESCRIPTION

Figure 1:
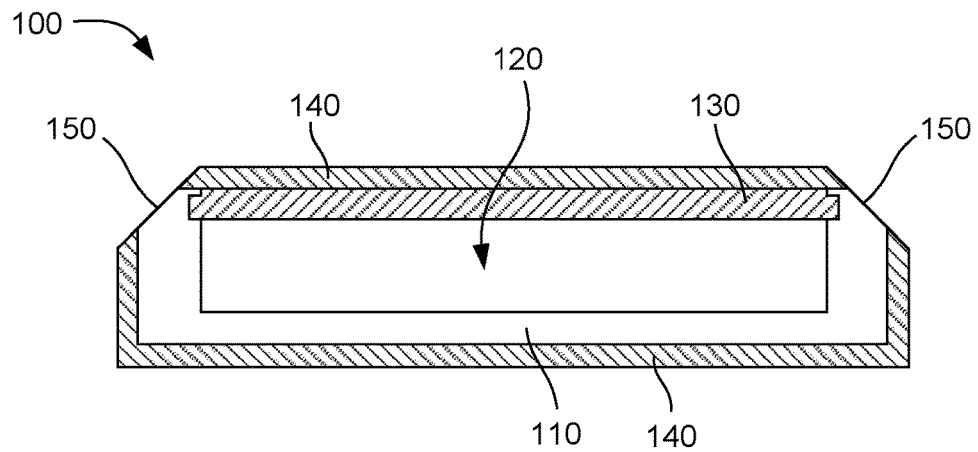
FIG. 1 is a cross-sectional view illustrating an example cover for an electronic device in accordance with examples of the present disclosure.

The present disclosure describes covers for electronic devices. In one example, a cover for an electronic device can include an aluminum cover frame including an opening. A magnesium or magnesium alloy cover panel can be supported by the aluminum or aluminum alloy cover frame at a position within or over the opening from magnesium or a magnesium alloy. A protective coating can be over a surface of the aluminum cover frame and a surface of the magnesium or magnesium alloy cover panel. A chamfer edge can include a chamfer at an edge of the aluminum cover frame. The chamfer exposes the aluminum or aluminum alloy cover frame beneath the protective coating, while the chamfer does not expose the magnesium or magnesium alloy cover panel. In a particular example, the protective coating can be a paint coating including a colorant and a polymeric binder. In an alternative example, the protective coating is an electrophoretic deposition coating including a polymeric binder, a pigment, and a dispersant. In other examples, the cover panel can include an alloy of magnesium with lithium, niobium, titanium, aluminum, zinc, lanthanum, cerium, neodymium, samarium, or a combination thereof.

The present disclosure also extends to electronic devices. In one example, an electronic device can include an electronic component and a cover enclosing the electronic component. The cover can include an aluminum or aluminum alloy cover frame comprising an opening, and a magnesium or magnesium alloy cover panel supported by the aluminum or aluminum alloy cover frame within or over the opening. In further detail, a protective coating can be over a surface of the aluminum or aluminum alloy cover frame and a surface of the magnesium or magnesium alloy cover panel. The cover can include a chamfered edge. The chamfered edge can include a chamfer at an edge of the aluminum or aluminum alloy cover frame, wherein the chamfer exposes the aluminum or aluminum alloy cover frame beneath the protective coating. The chamfer also does not expose the magnesium or magnesium alloy cover panel. In some examples, the electronic device can be a laptop, tablet computer, smartphone, e-reader, or a music player. In further examples, the chamfer can be located at an edge of a touchpad, an edge of a fingerprint scanner, an outer edge of the cover, an edge of a sidewall, or an edge of a logo. In a particular example, the protective coating can be a paint coating including a colorant and a polymeric binder. In an alternative example, the protective coating can be an electrophoretic deposition coating including a polymeric binder, a pigment, and a dispersant. In further examples, the cover panel can include an alloy of magnesium with lithium, niobium, titanium, aluminum, zinc, lanthanum, cerium, neodymium, samarium, or a combination thereof.

The present disclosure also extends to methods of making covers for electronic devices. In one example, a method of making a cover for an electronic device can include forming an aluminum cover frame having an opening, casting a cover panel in the opening from magnesium or a magnesium alloy, applying a protective coating over a surface of the aluminum cover frame and a surface of the magnesium or magnesium alloy cover panel, and chamfering an edge of the aluminum cover frame so that the chamfering cuts through the protective coating to expose the aluminum cover frame and wherein the chamfering does not expose the magnesium or magnesium alloy cover panel. In further examples, the aluminum cover frame can be formed by a computer numerical control (CNC) router, forging, die casting, or stamping. In a particular example, the cover panel can be formed by injection molding the cover panel in place within the opening of the aluminum cover frame. In some examples, applying the protective coating can be performed by either spraying a coating composition including a colorant and a polymeric binder or by electrophoretically depositing a coating composition including a polymeric binder, a pigment, and a dispersant. In further examples, the edge of the aluminum cover frame can be chamfered by a CNC router or by laser etching.

Covers for Electronic Devices

In some cases, light metal materials can be used to make covers for electronic devices. Generally, light metals can include aluminum, magnesium, titanium, lithium, niobium, zinc, and alloys thereof. These materials can have useful properties, such as low weight, high strength, and an appealing appearance. However, some of these metals can be easily oxidized at the surface, and may be vulnerable to corrosion or other chemical reactions at the surface. For example, magnesium or magnesium alloys in particular can be used to form covers for electronic devices because of the low weight and high strength of magnesium. Magnesium can have a somewhat porous surface that can be vulnerable to chemical reactions and corrosion at the surface. In some examples, magnesium or magnesium alloy can be treated by micro-arc oxidation to form a layer of protective oxide at the surface. This protective oxide layer can increase the chemical resistance, hardness, and durability of the magnesium or magnesium alloy. However, micro-arc oxidation can also create a dull appearance instead of the original luster of the metal.

The present disclosure describes covers for electronic devices that can include multiple different metals. In particular, the covers can include a cover frame made from aluminum or an aluminum alloy. The cover frame can include an opening, and a cover panel can be cast within the opening. The cover panel can be made from magnesium or a magnesium alloy. The cover frame and cover panel can be coated with a protective coating, such as a paint coating or an electrophoretic deposition coating. In some cases, it can be desirable to chamfer certain edges of the cover for ergonomics and/or to enhance the appearance of the cover. The cover frame and cover panel can be designed so that the chamfered edge is on the cover frame and not the cover panel. Thus, the chamfered edge can cut through the protective coating and expose the aluminum metal or aluminum alloy of the cover frame without exposing the magnesium or magnesium alloy of the cover panel, or the protective coating can be applied up to the chamfer. Aluminum can generally have a more stable surface compared to magnesium. Therefore, the bare aluminum metal or aluminum alloy at the chamfered edge can retain a metallic luster appearance better than the magnesium metal or magnesium alloy would have if the magnesium cover panel had been exposed by the chamfer.

FIG. 1 shows an example cover 100 for an electronic device, which includes an aluminum cover frame 110 having an opening 120. A magnesium or magnesium alloy cover panel 130 in this example is cast and supported by the aluminum cover frame, and in this example, is positioned within the opening defined by the aluminum cover frame. A protective coating 140 is applied over the surface of the cover frame and cover panel. Chamfered edges 150 are formed, two of which can be seen in cross-section at edges of the cover frame. The chamfers in this example are cut through the protective coating to expose the aluminum or aluminum alloy of the cover frame. However, the chamfers do not expose the magnesium or magnesium alloy of the cover panel.

As shown in FIG. 1, in some examples an edge of the aluminum or aluminum alloy cover frame can be chamfered so that the aluminum metal or aluminum alloy is visible through the opening in the protective layer created by the chamfer. The bare aluminum metal or aluminum alloy can have a metallic luster appearance that can be decorative in certain examples. The aluminum or aluminum alloy cover frame can be designed so that any desired edge can be chamfered in this way, depending on the desired appearance of the electronic device in which the cover is to be used. In some examples, the aluminum or aluminum alloy cover frame can be designed to include some or all of the edges of the electronic device cover, while magnesium or magnesium alloy cover panels can be cast in openings along faces of the cover. In other examples, edges of the cover may be formed of magnesium or magnesium alloy if those particular edges are not to be chamfered. Accordingly, edges of the final cover can be aluminum, aluminum alloy, magnesium, or magnesium alloy in any combination depending on the desired location of chamfered edges in the final cover.

As used herein, "chamfer" refers to the action of cutting away an edge where two faces meet to form a sloping face transitioning between the two original faces. In some examples, the chamfering can be at an edge of the aluminum frame meets with another material, such as a protective coating or another material that may be present. When chamfering in accordance with the present disclosure, the chamfering does not expose an underlying magnesium or magnesium alloy portion of the structure, but can be chamfered with any other material that may be present. In many cases, the original edge can be a 90° angle edge, and the chamfer can create a sloping face at a 45° angle. However, in some examples the original edge can have a different angle and the chamfer can create a sloping surface with a different angle. In further examples, chamfering can be performed using a milling machine with a cutting bit oriented to cut away the edge and create the sloped surface of the chamfered edge. In other examples, the chamfer can be performed by laser cutting, water jet cutting, sanding, or any other suitable method.

Figure 2:
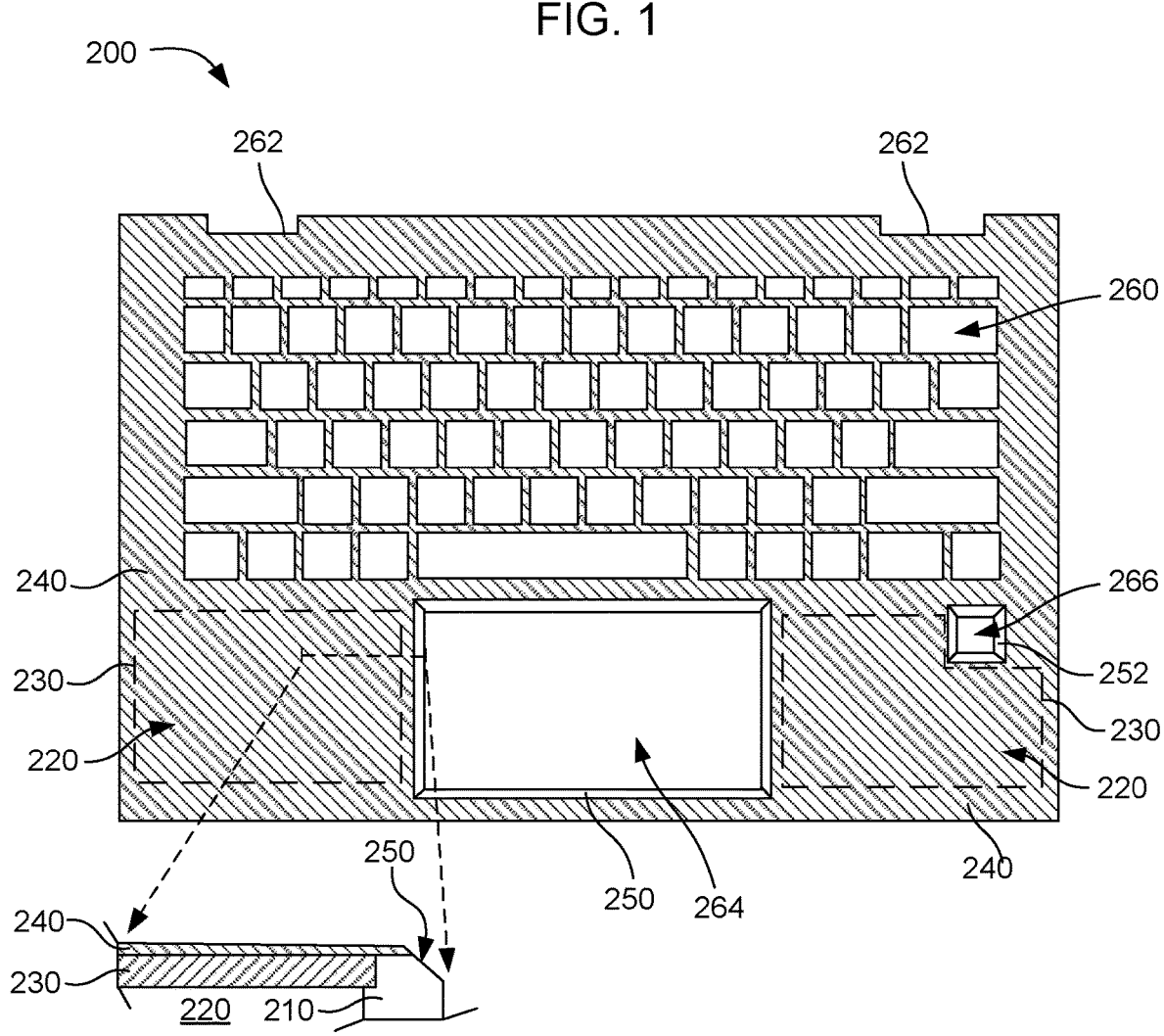
FIG. 2 is a top down view and includes a partial cross-sectional view of an example cover for an electronic device in accordance with examples of the present disclosure.

FIG. 2 shows a specific example cover 200 for an electronic device. This example is a top cover for the keyboard portion of a laptop (sometimes referred to as a "laptop cover C"). The cover includes key openings 260 for keyboard buttons (not shown) to be positioned therethrough, hinge recesses 262 to receive a hinge (not shown), a track pad opening 264 to receive a track pad (not shown), and a fingerprint scanner opening 266 to receive a fingerprint scanner (not shown). These are merely examples of structures that may be present, and are illustrative of many of a number or other structural components used with this type of top cover.

In this example, the cover includes aluminum or aluminum alloy in the form of a cover frame, a portion of which is shown in cross-section at 210 as well as at a chamfered track pad edge 250 that defines the track pad opening 264. In this example, cover frame includes two openings 220 defined by the cover frame as well as magnesium or magnesium alloy cover panels 230 that are not visible from the overhead plan view, but can be seen in cross-section. A protective coating 240 is also shown. In this example, the magnesium or magnesium alloy cover panels are supported by the aluminum or aluminum alloy cover frame, and furthermore, are cast and positioned within the respective openings. The magnesium or magnesium alloy cover panels are shown as dashed lines because the cover is coated by the protective coating, which hides the transition between the cover frame and the cover panels. The cover also includes, by way of example, a chamfered fingerprint sensor edge 252 similar to the chamfered track pad edge but defining a smaller opening. These chamfers cut through the protective coating and expose the aluminum or aluminum alloy of the cover frame, providing a border around the track pad and fingerprint scanner with an attractive metallic luster appearance. As shown, the magnesium or magnesium alloy cover panels are designed and located so that the chamfered edges do not expose the magnesium or magnesium alloy.

As used herein, "cover" refers to the exterior shell of an electronic device. In other words, the cover contains the internal electronic components of the electronic device. The cover is an integral part of the electronic device. The term "cover" is not meant to refer to the type of removable protective cases that are often purchased separately for an electronic device (especially smartphones and tablets) and placed around the exterior of the electronic device. Covers formed of light metal materials can be used on a variety of electronic devices. For example, laptop computers, smartphones, tablet computers, and other electronic devices can include light metal covers. In various examples, these covers can be formed by molding, casting, machining, bending, working, or another process. In one example, a cover can be milled from a single block of metal. In other examples, the cover can be made from multiple panels. For example, laptop covers sometimes include four separate cover pieces forming the complete cover of the laptop. The four separate pieces of the laptop cover are often designated as cover A (back cover of the monitor portion of the laptop), cover B (front cover of the monitor portion), cover C (top cover of the keyboard portion), and cover D (bottom cover of the keyboard portion). Covers can also be made for smartphones and tablet computers with a single metal piece or multiple metal panels.

As used herein, a layer that is referred to as being "on" a lower layer can be directly applied to the lower layer, or an intervening layer or multiple intervening layers can be located between the layer and the lower layer.

Generally, the covers described herein can include a cover frame and cover panel, and a protective coating can be applied on the cover frame and cover panel. Accordingly, a layer that is "on" a lower layer can be located further from the cover frame and cover panel. However, in some examples there may be other intervening layers such as a primer layer underneath the protective layer. Furthermore, the protective layer itself may include multiple layers, such as a base layer, a topcoat layer, and any other intervening layers. In some examples, the protective coating and any other layers may be applied to an exterior surface of the cover. Thus, a "higher" layer applied "on" a "lower" layer may be located farther from the cover substrate and closer to a viewer viewing the cover from the outside.

It is noted that when discussing covers for electronic devices, the electronic devices themselves, or methods of making covers for electronic devices, such discussions can be considered applicable to one another whether or not they are explicitly discussed in the context of that example. Thus, for example, when discussing the metals used in the cover frame or cover panels in the context of one of the example covers, such disclosure is also relevant to and directly supported in the context of the electronic devices and/or methods, and vice versa. It is also understood that terms used herein will take on their ordinary meaning in the relevant technical field unless specified otherwise. In some instances, there are terms defined more specifically throughout or included at the end of the present disclosure, and thus, these terms are supplemented as having a meaning described herein.

Electronic Devices

A variety of electronic devices can be made with the covers described herein. In various examples, such electronic devices can include various electronic components enclosed by the cover. As used herein, "encloses" or "enclosed" when used with respect to the covers enclosing electronic components can include covers completely enclosing the electronic components or partially enclosing the electronic components. Many electronic devices include openings for charging ports, input/output ports, headphone ports, and so on. Accordingly, in some examples the cover can include openings for these purposes. Certain electronic components may be designed to be exposed through an opening in the cover, such as display screens, keyboard keys, buttons, fingerprint scanners, cameras, and so on. Accordingly, the covers described herein can include openings for these components. Other electronic components may be designed to be completely enclosed, such as motherboards, batteries, sim cards, wireless transceivers, memory storage drives, and so on.

Figure 3:
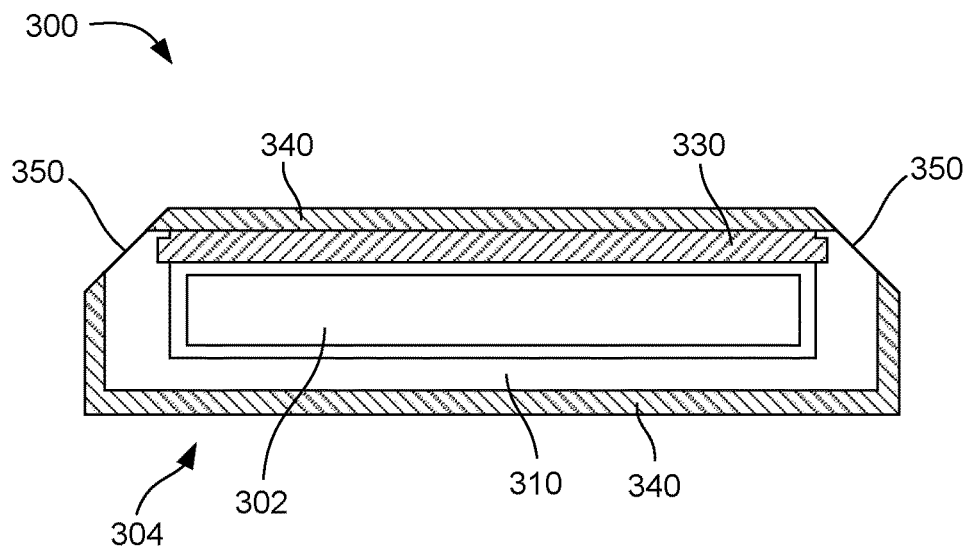
FIG. 3 is a cross-sectional view of an example electronic device in accordance with examples of the present disclosure.

FIG. 3 shows a cross-sectional view of an example electronic device 300. The electronic device includes an electronic component 302 and a cover 304 enclosing the electronic component. The cover includes an aluminum or aluminum alloy cover frame 310 and a magnesium or magnesium alloy cover panel 330 supported by the cover frame and cast w an opening of the cover frame. A protective coating 340 is applied over the surface of the cover frame and the cover panel. The cover includes chamfered edges 350 at multiple edges of the cover frame, two of which can be seen in this FIG. in cross-section. The chamfers cut through the protective coating and expose the aluminum or aluminum alloy of the cover frame. However, the chamfers do not expose the magnesium or magnesium alloy of the cover panel.

In further examples, the electronic device can be a personal computer, a laptop, a tablet computer, an e-reader, a music player, a smartphone, a mouse, a keyboard, or a variety of other types of electronic devices. In certain examples, the chamfered edge or edges can be located in decorative locations on the cover. Some examples include chamfered edges around track pads, around fingerprint scanners, at outer edges of the cover, at an edge of a sidewall, at an edge of a logo, and so on.

Methods of Making Covers for Electronic Devices

In some examples, the covers described herein can be made by first forming an aluminum or aluminum alloy cover frame. This can be accomplished using a variety of processes, including molding, casting, machining, stamping, bending, working, and so on. The cover frame can have an opening where a magnesium or magnesium alloy cover panel is to be formed. In certain examples, the magnesium or magnesium alloy cover panel can be cast directly in the opening. In a particular example, the cover panel can be formed in the opening by injection molding the magnesium or magnesium alloy. For example, the cover frame may be placed into a mold designed to hold both the cover frame and provide a space to inject magnesium or magnesium alloy to form the cover panel. Thus, the cover panel can be formed directly in the cover frame.

In some examples the cover frame can include locking features such as grooves, notches, pins, overhangs, and so on that can be filled in or around with magnesium or magnesium alloy during molding of the cover panel. The locking features can be any shape that causes the cover panel to be supported by, e.g., mechanically locked, held in place, etc., by the cover frame, and can also be positioned within the opening of the cover frame, e.g., partially or fully.

The protective coating can be applied by any suitable application method. In certain examples, the protective coating can be either a paint-type coating composition or an electrophoretic coating. In one example, a paint-type coating composition can be a liquid solution or dispersion including a colorant and a polymeric binder. The coating composition can be applied to the cover by any suitable method such as spraying, dip coating, and so on. In another example, the protective coating can be formed by electrophoretically depositing a coating composition including a polymeric binder, a pigment, and a dispersant.

The chamfered edges can be formed on an edge of the cover frame. Generally, the edge of the cover frame can be sufficiently spaced apart from any magnesium or magnesium alloy cover panels that the chamfer does not expose the magnesium or magnesium alloy. In some examples, the edge of the cover frame that is to be chamfered can be from about 1 mm to about 5 cm away from a cover panel. In other examples, the edge of the cover frame that is to be chamfered can be from about 2 mm to about 2 cm away from a cover panel. The chamfered edge can vary in depth. The term "depth" of chamfered edges refers to the amount of the edge that is cut away by the chamfering process. The depth of the chamfer can be stated in terms of the distance from the original edge of the cover to the edge of the sloped surface created by the chamfering. In various examples, the chamfer can be from about 0.1 mm to about 1 cm deep. In other examples, the chamfer can be from about 0.2 mm to about 5 mm deep. As stated above, in some examples the chamfer can be symmetrical so that the same amount of material is removed on both faces of the cover that meet at the chamfered edge. In a symmetrical chamfering of a 90° edge, the new sloped surface created by the chamfering is at a 45° angle with respect to the original faces of the cover. However, in other examples, the chamfer can be asymmetrical so that the angle of the sloped surface is different with respect to the original faces of the cover. The examples of the depth of the chamfer described above can refer to either side of the chamfer in the case of an asymmetrical chamfer.

The chamfered edge can be formed using any suitable process that can remove material at the edge of the cover frame and produce a sloped surface in place of the original edge. In some examples, the chamfer can be formed using a CNC machine such as a milling machine, a router, a laser cutter, a water jet cutter, a sander, a file, or other methods.

Figure 4:
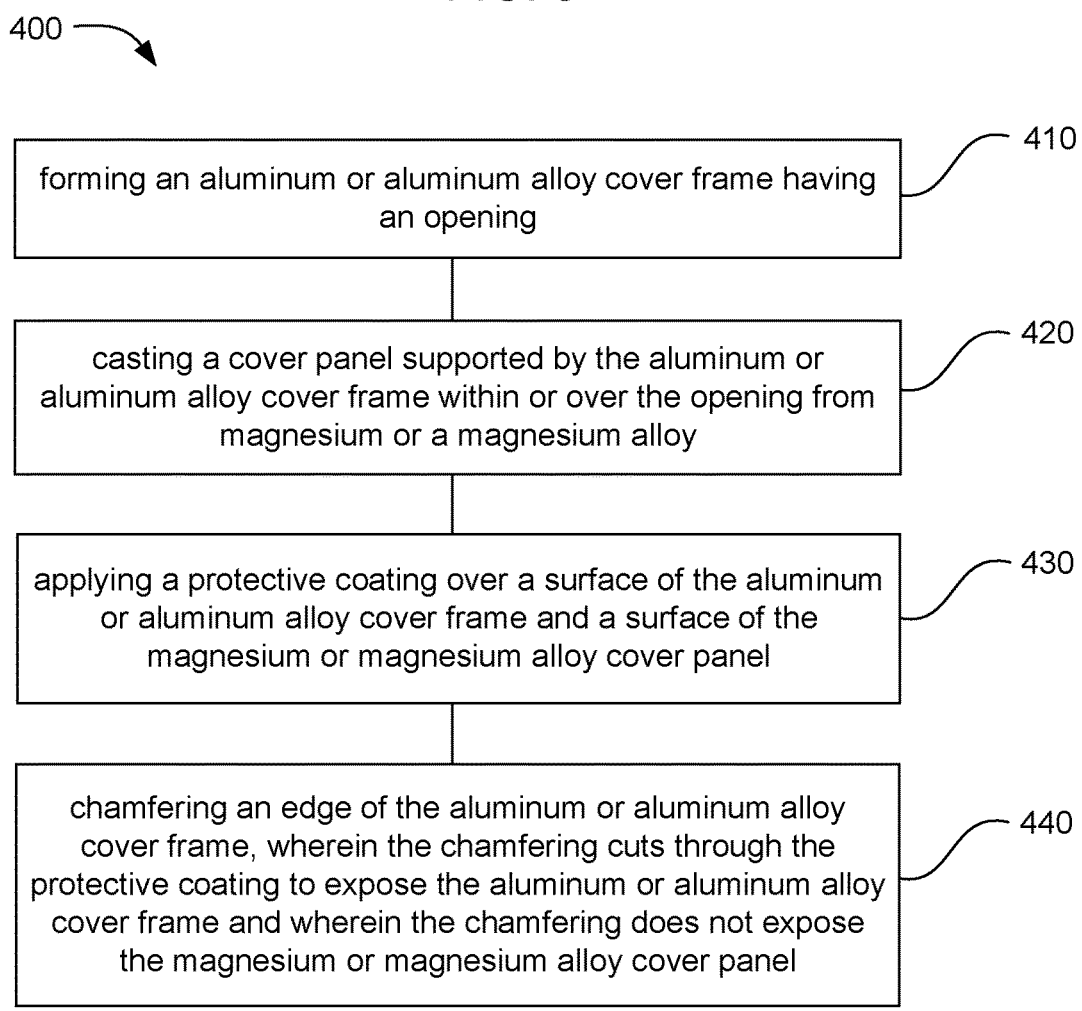
FIG. 4 is a flowchart illustrating an example method of making a cover for an electronic device in accordance with examples of the present disclosure.
Figure 5A:
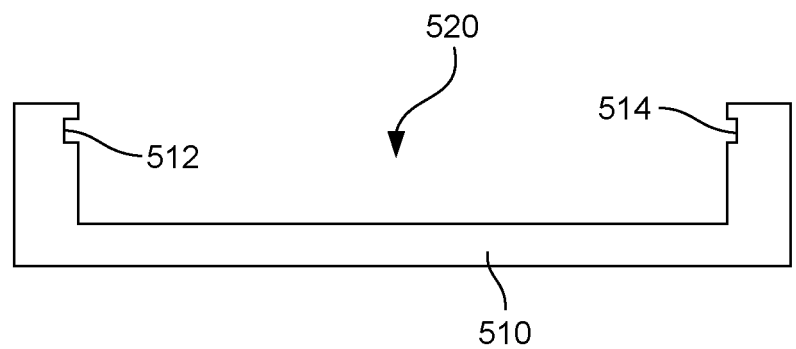
FIGS. 5A-5D are cross-sectional views illustrating an example method of making a cover for an electronic device in accordance with examples of the present disclosure.
Figure 5B:
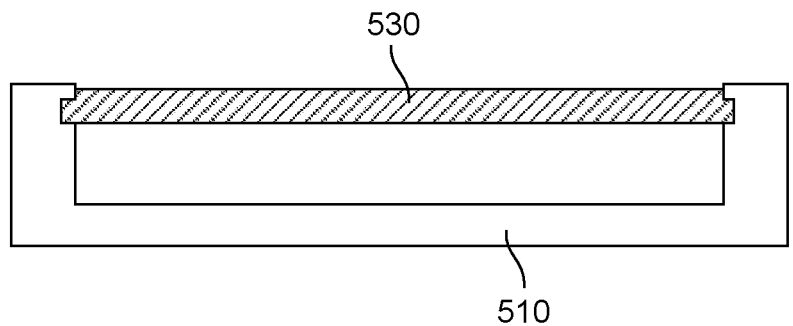
Figure 5C:
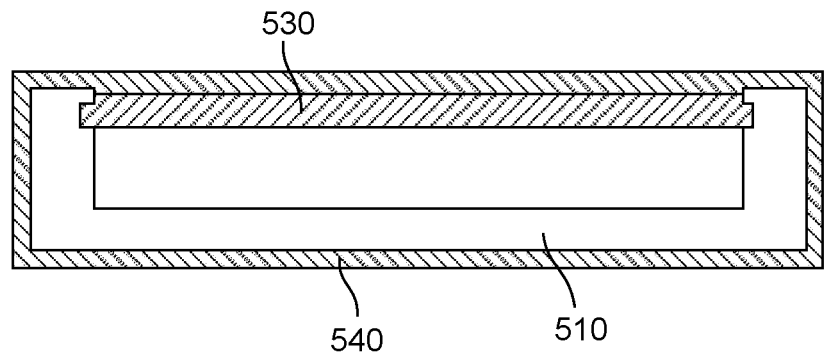
Figure 5D:
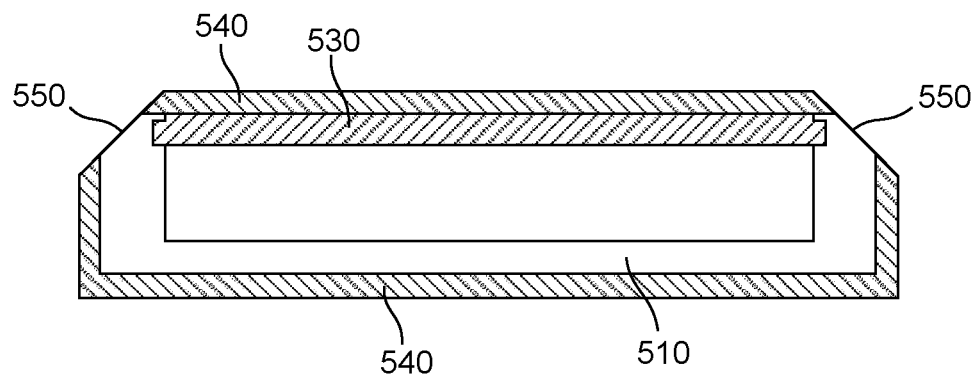

FIG. 4 is a flowchart illustrating an example method 400 of making a cover for an electronic device in accordance with examples of the present disclosure. The method includes forming 410 an aluminum or aluminum alloy cover frame having an opening, casting 420 a cover panel in the opening from magnesium or a magnesium alloy, and applying 430 a protective coating over a surface of the aluminum or aluminum alloy cover frame and a surface of the magnesium or magnesium alloy cover panel. The method can also include chamfering 440 an edge of the aluminum or aluminum alloy cover frame, wherein the chamfering cuts through the protective coating to expose the aluminum or aluminum alloy cover frame. The chamfering at the same time does not expose the magnesium or magnesium alloy cover panel FIGS. 5A-5D show cross-sectional views illustrating another example method of making a cover for an electronic device. In FIG. 5A, an aluminum or aluminum alloy cover frame 510 having an opening 520 is formed. In this example, the cover frame includes grooves 512, 514 as a locking feature to help hold the cover panel in place. In FIG. 5B, a cover panel 530 is injection molded from magnesium or a magnesium alloy and is supported by the aluminum (or aluminum alloy) cover frame 510 and in some examples, can be within the opening of the cover frame. In FIG. 5C, a protective coating 540 is applied to exterior surfaces of the cover frame 510 and the cover panel 530. In FIG. 5D, multiple edges (two shown in cross-section) are chamfered to form chamfered edges 550. The aluminum or aluminum alloy cover frame 510 is visible through the opening in the protective coating 540 formed by the chamfering at the chamfered edges, but the cover panel 530 is not exposed by the chamfering.

Cover Frames

In some examples, the cover frame can be made from aluminum or an aluminum alloy. In certain examples, the cover frame can be made of an aluminum alloy that is about 50% or more aluminum by weight. Other elements that can be included in aluminum alloys can include magnesium, titanium, lithium, niobium, zinc, bismuth, copper, cadmium, iron, thorium, strontium, zirconium, manganese, nickel, lead, silver, chromium, silicon, tin, gadolinium, yttrium, calcium, antimony, cerium, lanthanum, or others. Aluminum magnesium alloys can be used in which the alloys are made up of about 0.5% to about 13% magnesium by weight and 87% to 99.5% aluminum by weight. Examples of specific aluminum magnesium alloys can include 1050, 1060, 1199, 2014, 2024, 2219, 3004, 4041, 5005, 5010, 5019, 5024, 5026, 5050, 5052, 5056, 5059, 5083, 5086, 5154, 5182, 5252, 5254, 5356, 5454, 5456, 5457, 5557, 5652, 5657, 5754, 6005, 6005A, 6060, 6061, 6063, 6066, 6070, 6082, 6105, 6162, 6262, 6351, 6463, 7005, 7022, 7068, 7072, 7075, 7079, 7116, 7129, and 7178.

The cover frame can be shaped to fit any type of electronic device, including the specific types of electronic devices described herein. In some examples, the cover frame can have any thickness suitable for a particular type of electronic device. The thickness of the metal in the cover frame can be selected to provide a desired level of strength and weight for the cover of the electronic device. In some examples, the cover frame can have a thickness from about 0.5 mm to about 2 cm, from about 1 mm to about 1.5 cm, from about 1.5 mm to about 1.5 cm, from about 2 mm to about 1 cm, from about 3 mm to about 1 cm, from about 4 mm to about 1 cm, or from about 1 mm to about 5 mm, though thicknesses outside of these ranges can be used. Further, depending on the size and shape of cover panels to be added to the cover frame, the cover frame may be a majority part of the overall cover or a minority part of the overall cover. In various examples, the cover frame can represent from about 5 wt % to about 95 wt % of the total weight of the cover, including the cover panels. In further examples, the cover frame can represent from about 10 wt % to about 40 wt % of the total weight of the cover. In still further examples, the cover can include a single cover frame piece or multiple cover frame pieces joined together.

Cover Panels

The cover panel can be formed from magnesium or a magnesium alloy. A single cover for an electronic device can include one cover panel or multiple cover panels. The cover panels can be sized to fit in openings in the aluminum or aluminum alloy cover frame. As explained above, in some examples the cover panel can be formed by casting magnesium or magnesium alloy directly in the opening of the cover panel.

In various examples, the cover panel can be made from magnesium metal, a magnesium alloy that is 99% or more magnesium by weight, or a magnesium alloy that is from about 50% to about 99% magnesium by weight. Magnesium alloys can include other elements such as aluminum, titanium, lithium, niobium, zinc, bismuth, copper, cadmium, iron, thorium, strontium, zirconium, manganese, nickel, lead, silver, chromium, silicon, tin, gadolinium, yttrium, calcium, antimony, cerium, lanthanum, and others. In a particular example, the cover panel can be made of an alloy including magnesium and aluminum. Examples of magnesium-aluminum alloys can include alloys made up of from about 91% to about 99% magnesium by weight and from about 1% to about 9% aluminum by weight, and alloys made up of about 0.5% to about 13% magnesium by weight and 87% to 99.5% aluminum by weight. Specific examples of magnesium-aluminum alloys can include AZ63, AZ81, AZ91, AM50, AM60, AZ31, AZ61, AZ80, AE44, AJ62A, ALZ391, AMCa602, LZ91, and Magnox.

The cover panels are not particularly limited with respect to thickness. However, when used as a panel for a cover for an electronic device, the thickness of the substrate can be chosen with regard to the density of the magnesium or magnesium alloy (for purposes of controlling weight, for example), the hardness of the magnesium or magnesium alloy, the malleability of the magnesium or magnesium alloy, etc. In some examples, however, the thickness of the cover panels can be from about 0.5 mm to about 2 cm, from about 1 mm to about 1.5 cm, from about 1.5 mm to about 1.5 cm, from about 2 mm to about 1 cm, from about 3 mm to about 1 cm, from about 4 mm to about 1 cm, or from about 1 mm to about 5 mm, though thicknesses outside of these ranges can be used.

Protective Coatings

In some examples, a protective coating layer can be applied over the cover frame and cover panel. In a certain example, the protective coating layer can include a polymer resin. In certain examples, the polymer resin can be transparent and the protective coating layer can be a clear coat layer that allows the color of the underlying materials to show through. In further examples, the protective coating may be colored. In a particular example, the protective coating can include a layer of colored coating and a layer of clear coating on the colored coating. In some examples, the polymer resin of the clear coat layer can be clear poly(meth) acrylic, clear polyurethane, clear urethane (meth)acrylate, clear (meth)acrylic (meth)acrylate, or clear epoxy (meth) acrylate coating.

In further examples, the protective coating over the dried sol-gel oxide coating can be colored. In certain examples, the protective coating can include fillers such as pigment dispersed in an organic polymer resin. Non-limiting examples of pigments used in the protective coating layer can include carbon black, titanium dioxide, clay, mica, talc, barium sulfate, calcium carbonate, synthetic pigment, metallic powder, aluminum oxide, graphene, pearl pigment, or a combination thereof. The pigment can be present in the protective coating layer in an amount from about 0.5 wt % to about 30 wt % with respect to dry components of the protective coating layer, in some examples. In other examples, the amount of pigment can be from about 1 wt % to about 25 wt % or from about 2 wt % to about 15 wt % with respect to dry components of the protective coating layer.

The polymer resin included in the protective coating layer with the pigment can include polyester, poly(meth)acrylic, polyurethane, epoxy, urethane (meth)acrylate, (meth)acrylic (meth)acrylate, epoxy (meth)acrylate, or a combination thereof. As used herein, a "combination" of multiple different polymers can refer to a blend of homopolymers, a copolymer made up of the different polymers or monomers thereof, or adjacent layers of the different polymers. In certain examples, the polymer resin of the protective coating layer can have a weight-average molecular weight from about 100 g/mol to about 6,000 g/mol.

The thickness of the protective coating layer can be from about 5 μm to about 100 μm in some examples. In further examples, the thickness can be from about 10 μm to about 25 μm.

In certain examples, the protective coating layer can include a base coat that is colored and a top coat that is clear. Thus, the colored layer and the clear coat layer described above can be used together in certain examples. The overall thickness of the base coat with the top coat can be from about 2 μm to about 100 μm, from about 5 μm to about 60 μm, or from about 10 μm to about 40 μm, in some examples.

In further examples, the colored protective coating layer, the top clear coat layer, or both, can be radiation curable. The polymer resin used in these layers can be curable using heat and/or radiation. For example, a heat curing polymer resin can be used and then cured in an oven for a sufficient curing time. A radiation curing polymer resin can be exposed to sufficient radiation energy to cure the polymer resin. The protective coating layer can be cured after applying the layer to the cover. In certain examples, curing can include heating the protective coating layer at a temperature from about 50° C. to about 80° C. or from about 50° C. to about 60° C. or from about 60° C. to about 80° C. The layer can be heated for a curing time from about 5 minutes to about 40 minutes, or from about 5 minutes to about 10 minutes, or from about 20 minutes to about 40 minutes. In other examples, curing can include exposing the layer to radiation energy at an intensity from about 500 mJ/cm$^2$ to about 2,000 mJ/cm$^2$ or from about 700 mJ/cm$^2$ to about 1,300 mJ/cm$^2$. The layer can be exposed to the radiation energy for a curing time from about 5 seconds to about 30 seconds, or from about 10 seconds to about 30 seconds.

In other examples the protective coating can be an electrophoretic coating. The electrophoretic coating can include a polymeric binder, a pigment, and a dispersant. The electrophoretic coating process can sometimes be referred to as "electropainting" or "electrocoating" because of the use of electric current in the process. To deposit an electrophoretic coating on the cover for the electronic device, the cover (including the aluminum or aluminum alloy cover frame and the magnesium or magnesium alloy cover panel) can be placed in a coating bath. The coating bath can include a suspension of particles including the polymeric binder, pigment, and dispersant. In certain examples, the solids content of the coating bath can be from about 3 wt % to about 30 wt % or from about 5 wt % to about 15 wt %. The cover can be electrically connected to an electric power source. The cover can act as one electrode and the power source can also be attached to a second electrode that is also in contact with the coating bath. An electric current can be run between the cover and the second electrode. In certain examples, the electric current can be applied at a voltage from about 30 V to about 150 V. The electric current can cause the particles suspended in the coating bath to migrate to the surface of the cover and coat the surface. After this deposition process, additional processing may be performed such as rinsing the cover, baking the coated cover to harden the coating, or exposing the coated cover to radiation to cure radiation curable polymeric binders.

In some examples, electrophoretic coatings can include the same pigments and polymeric binders or resins described above in the paint-type protective coating. The thickness of the coating can also be in the same ranges described above.

DEFINITIONS

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 5% or other reasonable added range breadth of a stated value or of a stated limit of a range. The term "about" when modifying a numerical range is also understood to include the exact numerical value indicated, e.g., the range of about 1 wt % to about 5 wt % includes 1 wt % to 5 wt % as an explicitly supported sub-range.

As used herein, "liquid vehicle" or "ink vehicle" refers to a liquid fluid in an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe pigment colorants and other pigments such as organometallics, ferrites, ceramics, etc. In one specific example, however, the pigment is a pigment colorant As used herein, a plurality of items, structural elements, compositional elements, and/or materials may be presented in a common list for convenience. However, these lists should be construed as though the individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if individual numerical values and sub-ranges are explicitly recited. For example, a layer thickness from about 0.1 µm to about 0.5 µm should be interpreted to include the explicitly recited limits of 0.1 µm to 0.5 µm, and to include thicknesses such as about 0.1 µm and about 0.5 µm, as well as subranges such as about 0.2 µm to about 0.4 µm, about 0.2 µm to about 0.5 µm, about 0.1 µm to about 0.4 µm etc.

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

EXAMPLE

An example cover for an electronic device is made as follows:

1) A cover frame is made by molding aluminum metal. The cover frame includes a large rectangular opening for placing a magnesium alloy panel. The outer edge of the cover frame is located 5 mm away from the opening.

2) A magnesium alloy cover panel is formed and is supported by the aluminum cover frame, and in this example, is also positioned within the opening of the cover frame, by placing the cover frame in a mold and injection molding magnesium alloy into the space within the opening.

3) The cover frame and cover panel are painted by spraying a paint composition including a polymer binder and a black pigment to form a protective coating on the cover frame and cover panel.

3) A CNC milling machine is used to cut a chamfer along the outer edge of the cover frame. The chamfer has a depth of 3 mm so that the chamfer does not expose the magnesium alloy cover panel 5 mm away from the edge.

What is claimed is:

1. A cover for an electronic device comprising:
   an aluminum or aluminum alloy cover frame comprising an opening;
   a magnesium or magnesium alloy cover panel supported by the aluminum or aluminum alloy cover frame within or over the opening;
   a protective coating over a surface of the aluminum or aluminum alloy cover frame and a surface of the magnesium or magnesium alloy cover panel; and
   a chamfered edge including a chamfer at an edge of the aluminum or aluminum alloy cover frame, wherein the chamfer exposes the aluminum or aluminum alloy cover frame beneath the protective coating and wherein the chamfer does not expose the magnesium or magnesium alloy cover panel.

2. The cover of claim 1, wherein the protective coating is a paint coating comprising a colorant and a polymeric binder.

3. The cover of claim 1, wherein the protective coating is an electrophoretic deposition coating comprising a polymeric binder, a pigment, and a dispersant.

4. The cover of claim 1, wherein the cover panel comprises an alloy of magnesium with lithium, niobium, titanium, aluminum, zinc, lanthanum, cerium, neodymium, samarium, or a combination thereof.

5. An electronic device comprising:
   an electronic component; and
   a cover enclosing the electronic component, the cover comprising:
      an aluminum or aluminum alloy cover frame comprising an opening,
      a magnesium or magnesium alloy cover panel supported by the aluminum or aluminum alloy cover frame within or over the opening,
      a protective coating over a surface of the aluminum or aluminum alloy cover frame and a surface of the magnesium or magnesium alloy cover panel, and
      a chamfered edge including a chamfer at an edge of the aluminum or aluminum alloy cover frame, wherein the chamfer exposes the aluminum or aluminum alloy cover frame beneath the protective coating and wherein the chamfer does not expose the magnesium or magnesium alloy cover panel.

6. The electronic device of claim 5, wherein the electronic device is a laptop, tablet computer, smartphone, e-reader, or a music player.

7. The electronic device of claim 6, wherein the chamfered edge is located at an edge of a touch pad, an edge of a fingerprint scanner, an outer edge of the cover, an edge of a sidewall, or an edge of a logo.

8. The electronic device of claim 5, wherein the protective coating is paint coating comprising a colorant and a polymeric binder.

9. The electronic device of claim 5, wherein the protective coating is an electrophoretic deposition coating comprising a polymeric binder, a pigment, and a dispersant.

10. The electronic device of claim 5, wherein the cover panel comprises an alloy of magnesium with lithium, niobium, titanium, aluminum, zinc, lanthanum, cerium, neodymium, samarium, or a combination thereof.

11. A method of making a cover for an electronic device comprising:
   forming an aluminum or aluminum alloy cover frame having an opening;
   casting a cover panel supported by the aluminum or aluminum alloy cover frame within or over the opening from magnesium or a magnesium alloy;
   applying a protective coating over a surface of the aluminum or aluminum alloy cover frame and a surface of the magnesium or magnesium alloy cover panel; and chamfering an edge of the aluminum or aluminum alloy cover frame, wherein the chamfering cuts through the protective coating to expose the aluminum or aluminum alloy cover frame and wherein the chamfering does not expose the magnesium or magnesium alloy cover panel.

12. The method of claim 11, wherein the aluminum cover frame is formed by a computer numerical control (CNC) router, forging, die casting, or stamping.

13. The method of claim 11, wherein the cover panel is formed by injection molding the cover panel in place within the opening of the aluminum cover frame.

14. The method of claim 11, wherein applying the protective coating is performed either by spraying or dipping a coating composition comprising a colorant and a polymeric binder or by electrophoretically depositing a coating composition comprising a polymeric binder, a pigment, and a dispersant.

15. The method of claim 11, wherein the edge of the aluminum cover frame is chamfered by a CNC router or by laser etching.

* * * * *